US010250045B2

(12) United States Patent
Sherstyuk et al.

(10) Patent No.: US 10,250,045 B2
(45) Date of Patent: Apr. 2, 2019

(54) SYSTEM AND METHOD FOR BATTERY PACK

(71) Applicant: GBATTERIES ENERGY CANADA INC., Ottawa (CA)

(72) Inventors: Mykola Sherstyuk, Ottawa (CA); Oleksandr Tkachenko, Ottawa (CA)

(73) Assignee: GBatteries Energy Canada Inc., Ottawa (CA)

( * ) Notice: Subject to any disclaimer, the term of this patent is extended or adjusted under 35 U.S.C. 154(b) by 0 days.

(21) Appl. No.: 15/861,610

(22) Filed: Jan. 3, 2018

(65) Prior Publication Data
US 2018/0191176 A1 Jul. 5, 2018

Related U.S. Application Data

(60) Provisional application No. 62/442,932, filed on Jan. 5, 2017.

(51) Int. Cl.
H02J 7/00 (2006.01)

(52) U.S. Cl.
CPC ............ H02J 7/0021 (2013.01); H02J 7/008 (2013.01); H02J 7/0093 (2013.01); Y02E 70/40 (2013.01)

(58) Field of Classification Search
CPC ........ H02J 7/008; H02J 7/0021; H02J 7/0024; H02J 7/0093
USPC .................................. 320/112, 116–119, 126
See application file for complete search history.

(56) References Cited

U.S. PATENT DOCUMENTS

| 5,296,797 | A | 3/1994 | Bartlett |
| 5,734,205 | A * | 3/1998 | Okamura ............... H02J 7/0024 |
| | | | 307/110 |
| 6,150,795 | A | 11/2000 | Kutkut et al. |
| 6,841,974 | B2 | 1/2005 | Dykeman |
| 7,622,898 | B2 | 11/2009 | Shimizu et al. |
| 10,069,313 | B2 | 9/2018 | Tkachenko et al. |

(Continued)

FOREIGN PATENT DOCUMENTS

| EP | 0 762 593 A2 | 3/1997 |
| KR | 10-2004-0080907 A | 9/2004 |

(Continued)

OTHER PUBLICATIONS

International Search Report and Written Opinion for PCT Application No. PCT/CA2017/050833 dated Sep. 29, 2017.

(Continued)

Primary Examiner — Zixuan Zhou
(74) Attorney, Agent, or Firm — Schott, P.C.

(57) ABSTRACT

A battery pack includes an arrangement of battery cells organized in battery groups connected in series, with each group having one or more battery units connected in parallel, and each battery unit comprising one or more series-connected battery cells connected to a battery switch. Charging of the battery pack uses pulse charging. The charging pulses provided to the battery units can be determined based on one or more measured characteristics of battery cells comprising the battery unit so that charging of the battery units can be optimized according to those characteristics. The charging pulses provided to each battery group are timed so that there is an uninterrupted flow of charging current through all the battery groups at all times.

20 Claims, 15 Drawing Sheets

(56) References Cited

U.S. PATENT DOCUMENTS

| | | | |
|---|---|---|---|
| 2006/0139020 A1* | 6/2006 | Wood | G05F 1/70 323/283 |
| 2011/0291619 A1* | 12/2011 | Asakura | H01M 10/441 320/118 |
| 2013/0300370 A1* | 11/2013 | Hotta | H01M 10/425 320/117 |
| 2014/0340044 A1 | 11/2014 | Kim et al. | |
| 2016/0079788 A1* | 3/2016 | Amasaki | H02J 7/0021 320/136 |
| 2017/0005497 A1 | 1/2017 | Sherstyuk et al. | |
| 2018/0013306 A1 | 1/2018 | Tkachenko et al. | |

FOREIGN PATENT DOCUMENTS

| | | |
|---|---|---|
| WO | 98/52270 A1 | 11/1998 |
| WO | 2018/010019 A1 | 1/2018 |
| WO | 2018/126319 A1 | 7/2018 |

OTHER PUBLICATIONS

International Search Report and Written Opinion for PCT Application No. PCT/CA2018/050006 dated Apr. 4, 2018.

* cited by examiner

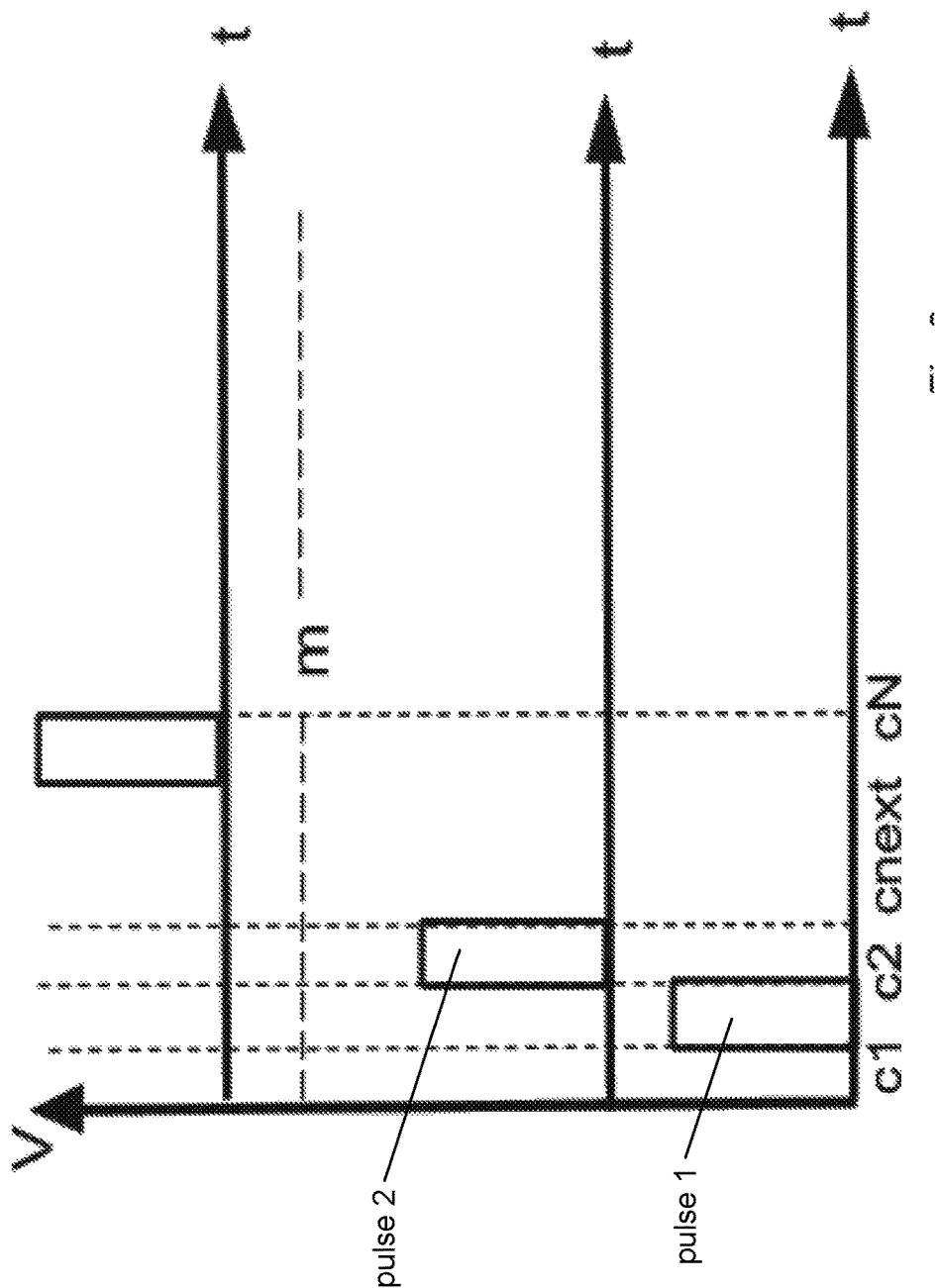

SYSTEM AND METHOD FOR BATTERY PACK

CROSS REFERENCE TO RELATED APPLICATIONS

Pursuant to 35 U.S.C. § 119(e), this application is entitled to and claims the benefit of the filing date of U.S. Provisional App. No. 62/442,932, filed Jan. 5, 2017, the content of which is incorporated herein by reference in its entirety for all purposes.

This application is related to commonly owned U.S. application Ser. No. 15/644,498 filed Jul. 7, 2017, now U.S. Pat. No. 10,135,281, the content of which is incorporated herein by reference in its entirety for all purposes.

BACKGROUND

A battery pack typically comprises some configuration of several battery cells. A battery cell typically includes a casing to hold the components the of the battery cell. The battery cell may include an anode (negative electrode) immersed in a suitable electrolyte. The anode may comprise any suitable compound such as porous carbon particles; e.g. graphite particles arranged into sheets. The battery cell may further include a cathode immersed in an electrolyte. The cathode may comprise any suitable metal oxide compound such as cobalt-oxide ($CoO_2$) particles. Many types of battery cells are known, but for discussion purposes lithium-ion types will be used.

A battery discharges, for example, when it is connected across a load. During discharging, ions (e.g., lithium ions) flow through the electrolyte from the negative electrode to the positive electrode. Electrons flow from the negative electrode to the positive electrode through the load. The lithium ions and electrons combine at the positive electrode. When no more Li ions flow for the given discharge potential applied across the cell, the battery can be deemed to be fully discharged.

During charging, the lithium ions flow from the positive electrode to the negative electrode through the electrolyte. Electrons flow through the external charger in the direction from the positive electrode to the negative electrode. The electrons and lithium ions combine at the negative electrode and deposit there. When no more Li ions flow for the given charge potential applied across the cell, the battery can be deemed fully charged and ready to use.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 5 illustrates a pulse timing diagram.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
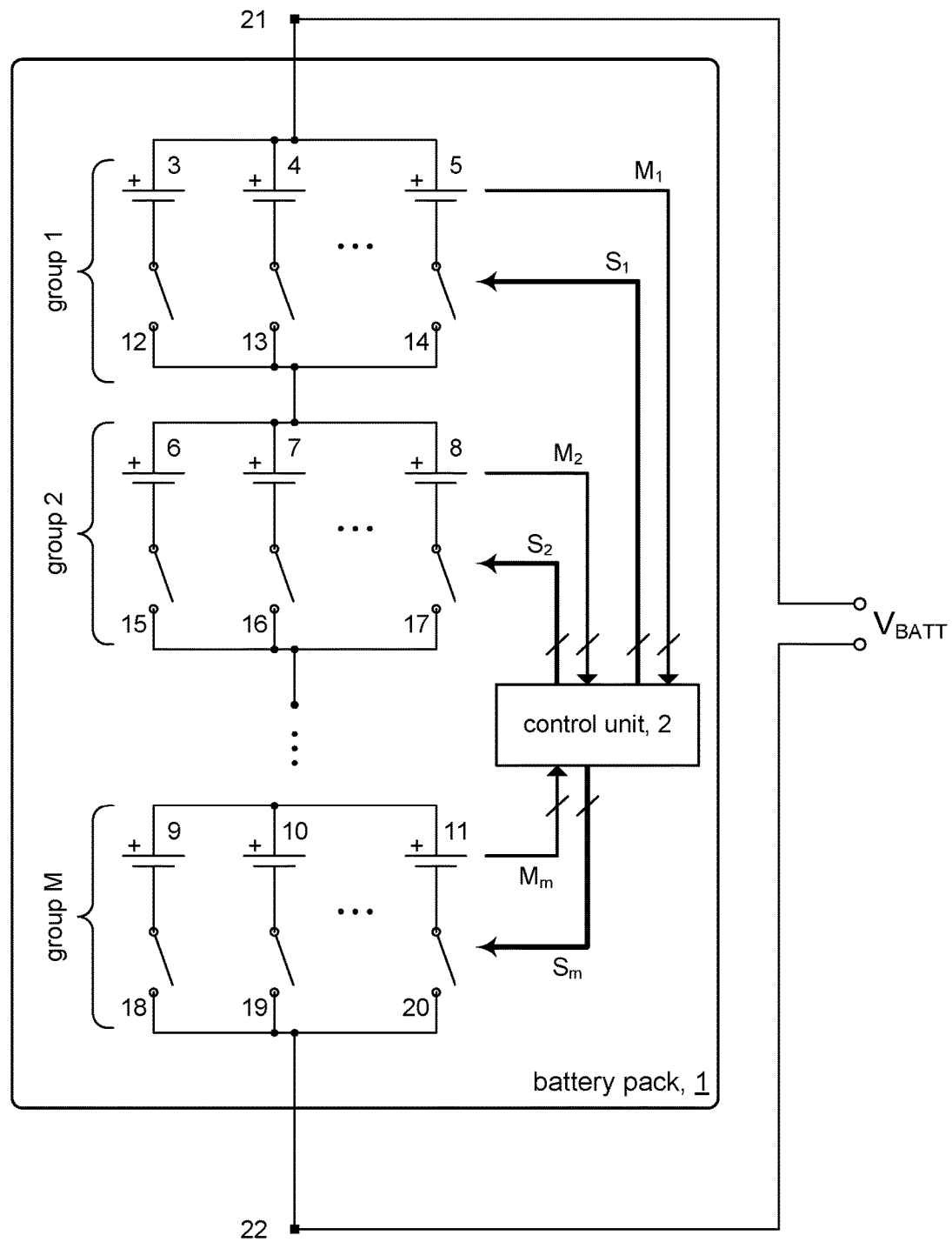
FIGS. 1 and 1A depict high level schematics of a battery pack in accordance with the present disclosure.

FIG. 1 shows an embodiment of a battery pack 1 in accordance with the present disclosure. The battery pack 1 may comprise a plurality of battery cells 3-11. Each battery cell 3-11 may be connected to a corresponding switching element 12-20 (battery switch); e.g., an FET switch. The battery cells 3-11 may be organized into M battery groups, group 1, group 2, group m. Each battery group may have N battery cells connected in parallel, for a total of M×N battery cells in the battery pack 1. In some embodiments, for example, N may be 2-100. Battery group 1, for example, comprises N battery cells 3, 4, . . . 5. Battery group 2 comprises N battery cells 6, 7, . . . 8, and so on. In some embodiments, each battery group may have the same number N of battery cells. In other embodiments, the number N of battery cells may vary from one battery group to another. The number M of battery groups can depend on the desired output voltage $V_{BATT}$ of the battery pack 1. For example, if the desired $V_{BATT}$ is 400 V and the battery cells 3-11 are 3.7 V batteries, then there will be M=108 battery groups for a $V_{BATT}$ of 399.6 V. The battery cells 3-11 may be lithium-ion battery cells. Other configurations of M and N are possible.

Figure 1A:
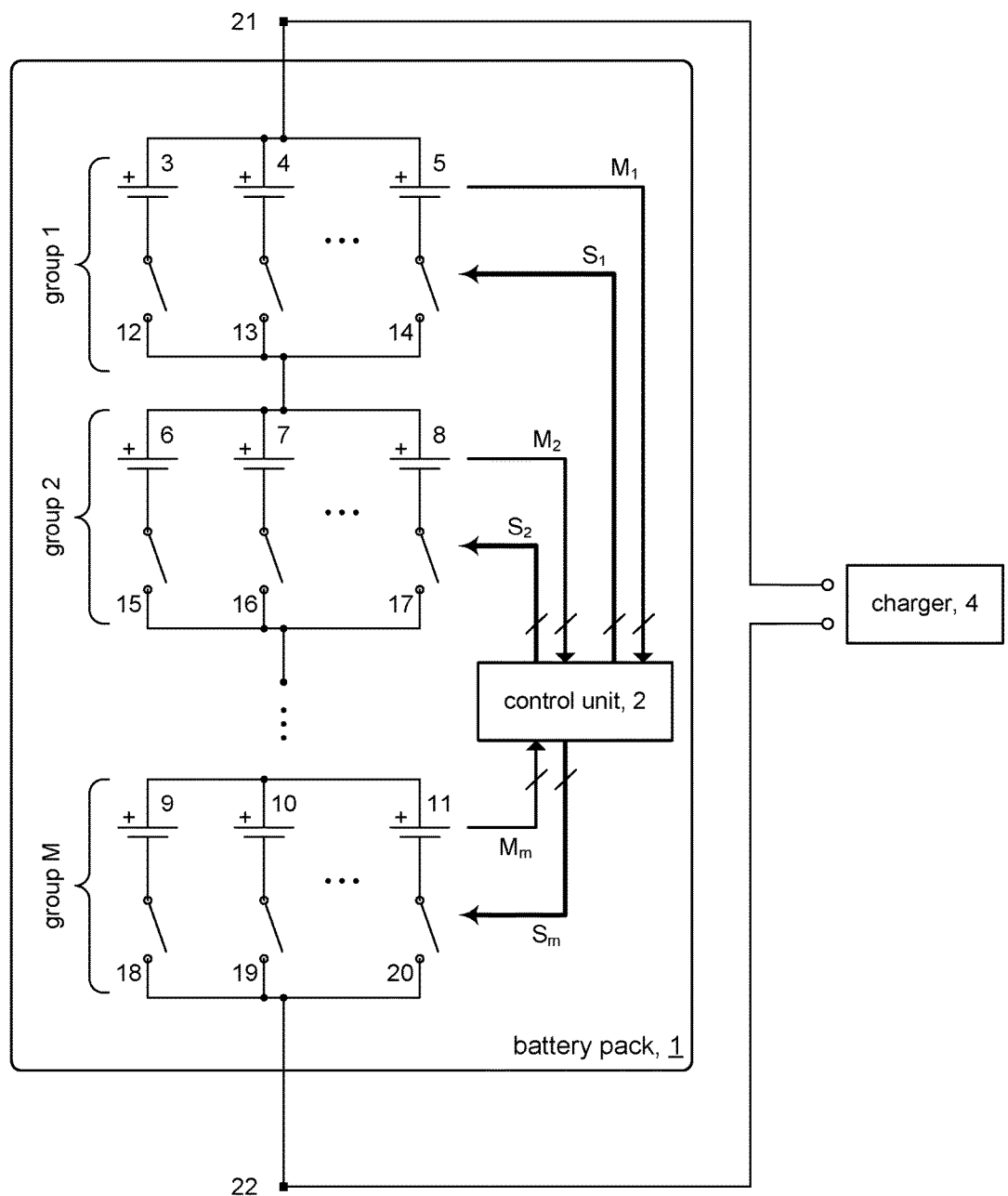

During charging of battery pack 1, a charger voltage from a charger 4 gets connected to battery pack 1 at terminals 21 and 22. This configuration is shown in FIG. 1A.

The battery pack 1 may include a control unit 2. In accordance with the present disclosure, the control unit 2 may include circuitry to perform measurements for each battery cell 3-11 in the battery pack 1. Battery cell measurements may be taken for each battery cell in each battery group. Each battery group may have a set of measurement lines $M_x$ that feed into the control unit 2, to allow for each battery cell in that battery group to be individually measured. For example, battery group 1 may provide a set $M_1$ of measurement lines, battery group 2 may provide a set of measurement lines $M_2$, and so on. Battery cell measurements may be done at time intervals allowing to digitize precise values and dynamic changes of measured parameters for each battery cell in real time. As will be discussed below, the measurements may be used by the control unit 2 to control the ON (conducting)/OFF (non-conducting) states of the switching elements 12-20.

The switching elements 12-20 of the battery pack 1 can be controlled by control unit 2. The control unit 2 may output control signals (switching signals) for each battery group via a set of switching lines $S_x$. For example, a set of switching lines $S_1$ provided to battery group 1 may comprise a control line for each switching element 12, 13, . . . 14 in battery group 1, a set of switching lines $S_2$ provided to battery group 2 may comprise a control line for each switching element 15, 16, . . . 17 in battery group 2, and so on. During charging of battery pack 1, each battery cell 3-11 of the battery pack 1 gets pulse charged via its corresponding switching element 12-20. In accordance with the present disclosure, the switching elements 12-20 of the battery pack 1 may be controlled such that the charge current from the charger 4 flowing into the battery pack 1 through terminals 21 and 22 is substantially constant while the battery pack is being charged.

In some embodiments, the ON times for the switching elements 12-20 may be interleaved (or overlap) to keep overall charge current from the charger 4 flowing into the battery pack 1 substantially constant (e.g., at a predetermined level) to avoid current fluctuations in the charge, since current fluctuations in certain chargers (e.g., switching type voltage regulators) can damage the charger. In some embodiments, the switching elements 12-20 may be operated so that the total charge current from the charger 4 into the battery pack 1 can vary within a predetermined range between a maximum charge current and a minimum charge current.

Maintaining a substantially constant charge current through battery pack 1 at all times during charging allows for the use of battery chargers designed for traditional charging protocols such as CCCV (constant current/constant voltage) and the like, while at the same time allowing the each battery cell in the battery pack to be charged using advanced pulse charging protocols to optimize charging for that battery cell. For example, an advanced pulse charging protocol developed by the inventors may operate the switching elements 12-20 with ON times in the range from 0.5 µS to 100 mS. Such pulse charging protocols in some cases require OFF durations for battery cell current in the range from 0.5 µS to 1000 mS. See for example, commonly owned U.S. application Ser. No. 15/644,498 filed Jul. 7, 2017, the content of which is incorporated herein by reference in its entirety for all purposes.

Figure 2:
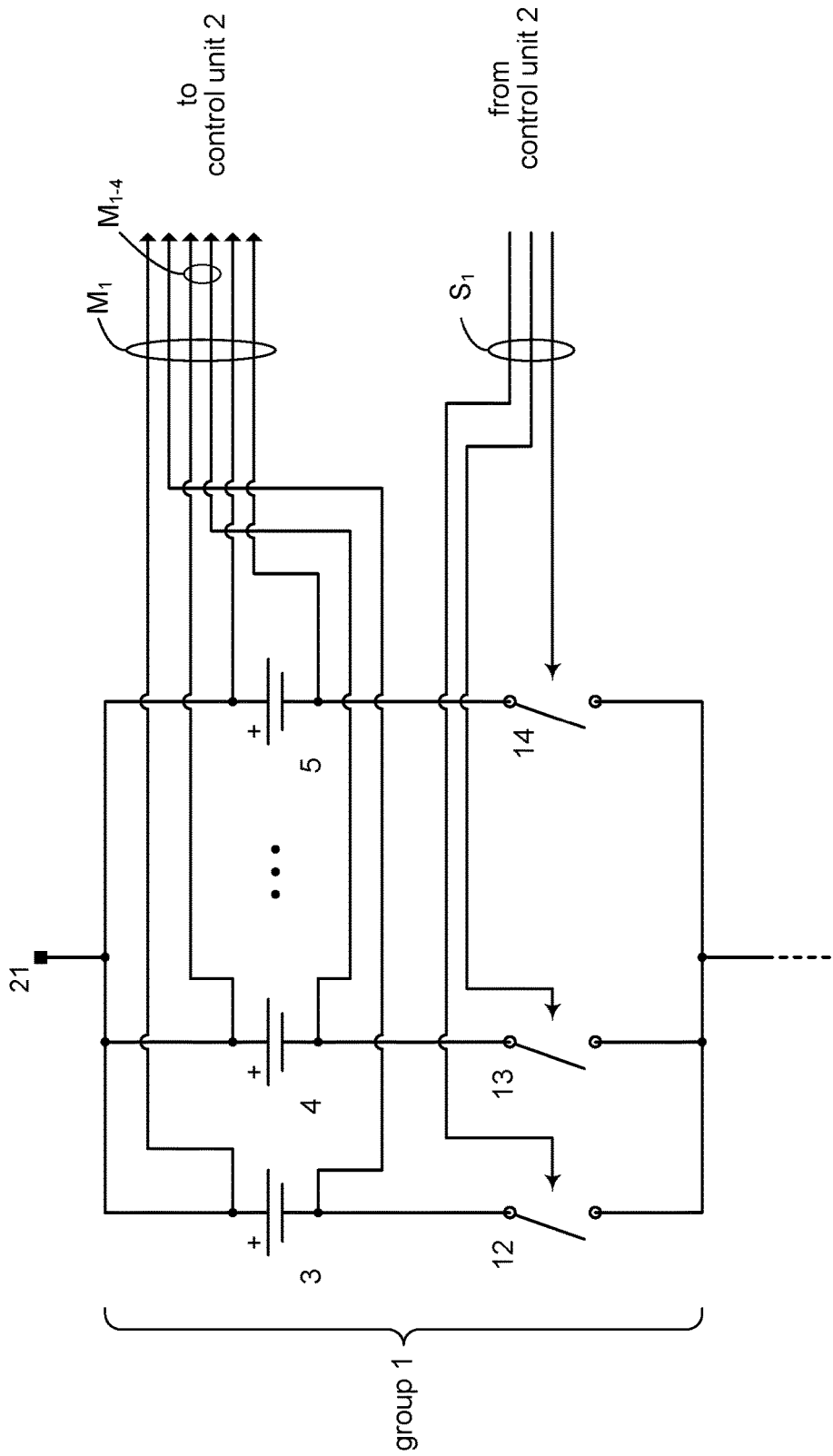
FIG. 2 shows details of a battery group in accordance with the present disclosure.

FIG. 2 illustrates details of a battery group, for example battery group 1, in accordance with some embodiments of the present disclosure. The figure shows that the set of measurement lines $M_1$ may comprise pairs of sense lines to sense voltages across respective corresponding battery cells 3-5 in battery group 1. For example, sense lines $M_{1-4}$ are connected across battery cell 14. Although not shown, it will be understood that in some embodiments, the measurement lines may include sense lines for each battery cell to measure the current flow through that battery cell. More generally, measurement lines can be provided to measure any characteristic of the battery cell. FIG. 2 further shows the set of switching lines $S_1$ may comprise respective switching control lines to control the ON/OFF state of each switching element 12, 13, . . . 14 connected to the corresponding battery cells 3, 4, . . . 5 in battery group 1.

Figure 3:
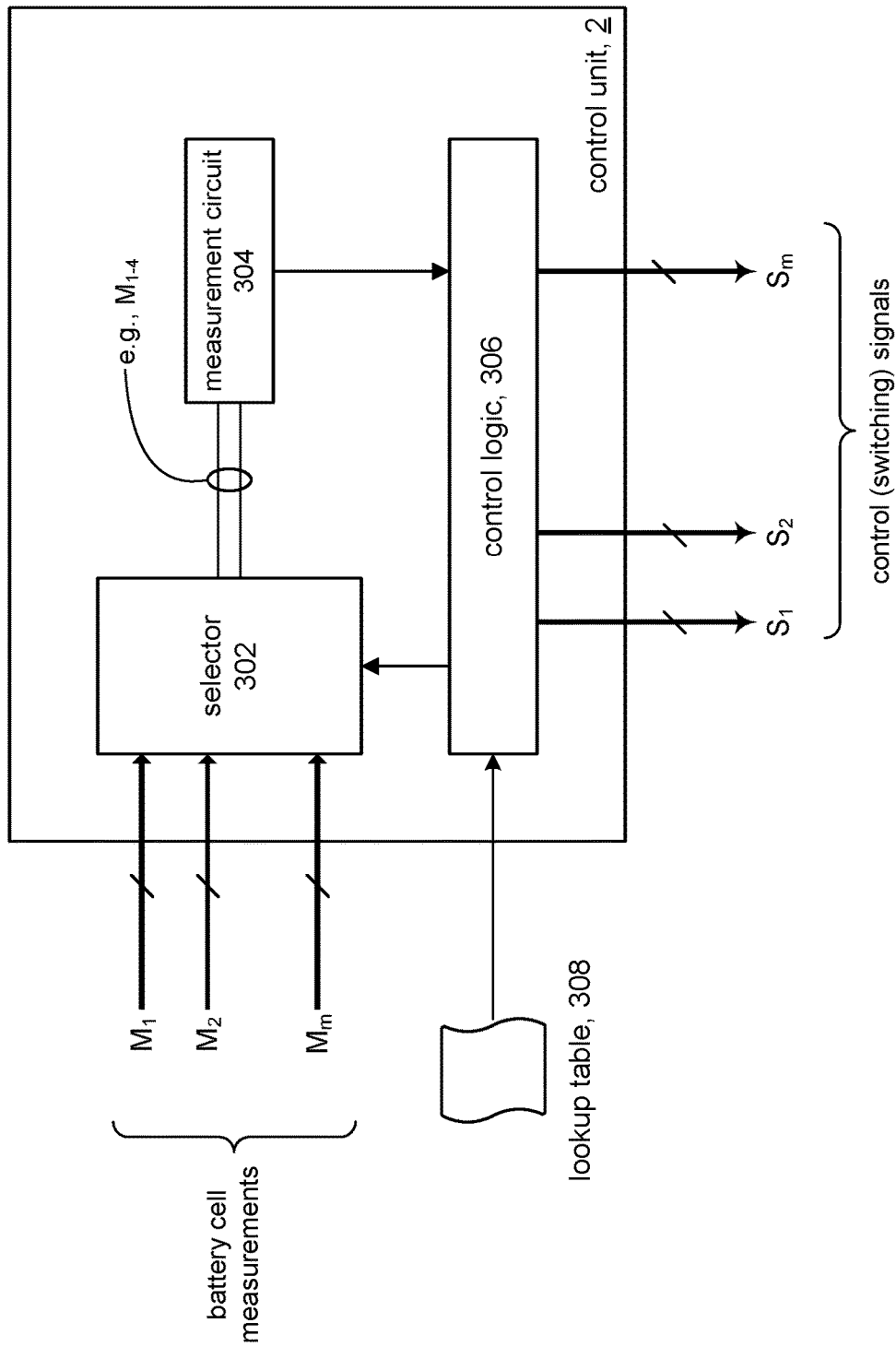
FIG. 3 shows details of a control unit in accordance with the present disclosure.

FIG. 3 illustrates details of the control unit 2 in accordance with some embodiments. The control unit 2 may include a selector 302. The measurement lines $M_x$ feed in the selector 302. The selector 302 may output the signals on a pair of sense lines from among the sense lines in all of the measurement lines. For example, FIG. 3 shows that the selector 302 is outputting signals on sense lines $M_{1-4}$ (see FIG. 2), which are connected to battery cell 14 in battery group 1. The selector 302 can therefore provide access to the voltage across any battery cell in the battery pack 1.

The control unit 2 may include a measurement circuit 304 to measure the signals provided by the selector 302; e.g., the battery voltage across a given battery cell, current flow through a given battery cell, etc. The measurement circuit 304 may provide the voltage level (e.g., as a digital signal) to control logic 306. In general, the measurement circuit 304 and sense lines can be configure to make measurements on battery cells (such as shown in the figures), on battery units (see FIG. 8A), on battery groups, or on the entire battery pack itself.

The control logic 306 may output control signals (switching signals) on its switching lines $S_1$-$S_m$ to control the ON/OFF state of the switching elements 12-20. The control logic 306 may operate the selector 302 to take measurements of a battery cell (via the measurement circuit 304) and operate the switching element connected to that battery cell based on the measurements; e.g., control the ON times and OFF times of the switching element. In accordance with the present disclosure, the control logic 306 can generate control signals based on respective measurements made on the battery cells 3-11 connected to the switching elements 12-20. In some embodiments, a lookup table 308 can store previously measured characteristics of one or more battery cells. Since the control signals for each switching element are based on the measured characteristics of the corresponding battery cell, the charging of each battery cell in the battery pack can be optimized.

Figure 4:
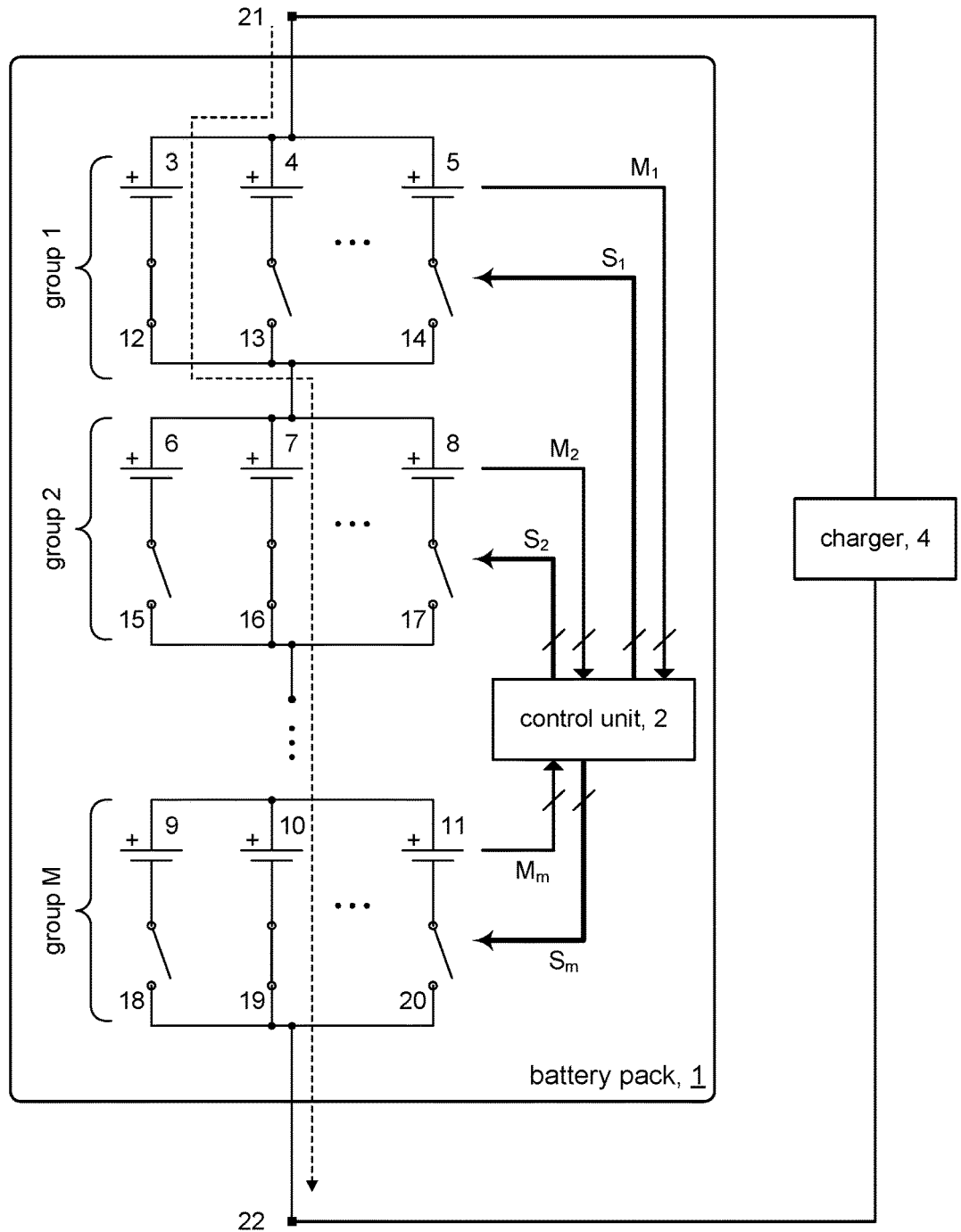
FIGS. 4 and 4A illustrate examples of switch configurations.

In order to maintain a completed circuit through the battery pack 1 at all times during charging, one or more switching elements in each battery group (group 1, group 2, etc.) must be turned ON in order to provide a path for the charging current to flow from the charger through at least one battery cell in each battery group. FIG. 4 shows an example of a switching state during charging. The figure shows that switch 12 in battery group 1 is ON (conducting, CLOSED), switch 16 in battery group 2 is ON, and so on to switch 19 in battery group M. This switch configuration completes a circuit between terminals 21 and 22 of the battery pack 1 for charging by the charger. Thus, during a charging process in accordance with the present disclosure, the control signals can control each of the switching elements so that the charging of each corresponding battery cell can be optimized, and at the same time, timing of the ON times of switching elements in the battery groups can be selected so that there is overlap in order to ensure there is always at least one CLOSED switching element in each battery group at all times during charging so that a complete circuit between terminals 21 and 22 of the battery pack 1 is always present.

Figure 4A:
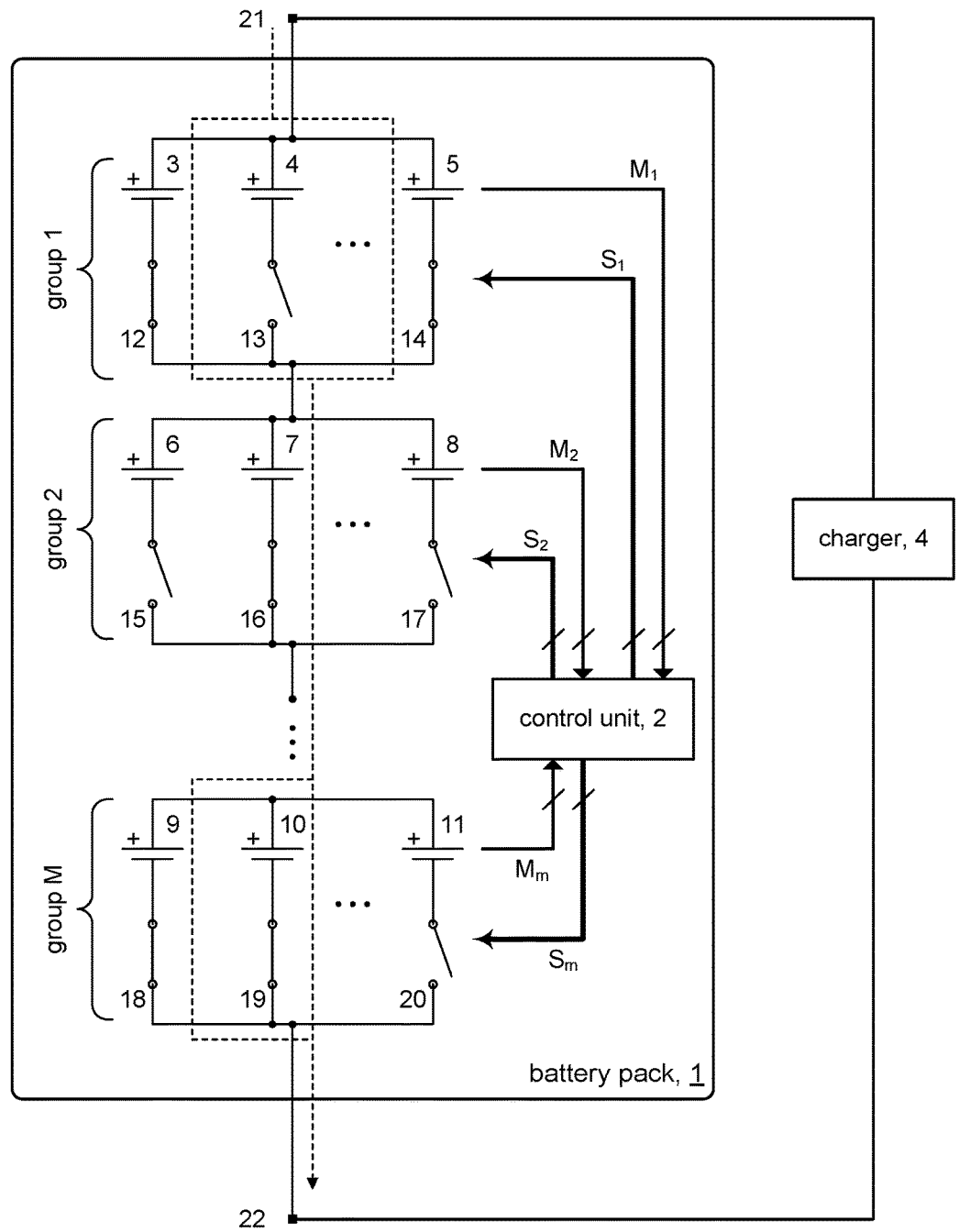

In some embodiments, the control unit 2 may "switch in" a single battery cell (i.e., turn ON the switching element corresponding to the battery cell) from each battery group to complete a circuit path between terminals 21, 22. This switch configuration is shown in FIG. 4, for example. In other embodiments, the control unit 2 may use a switch configuration that switches in two or more battery cells in a given battery group during charging. FIG. 4A, for example, shows a switch configuration in which battery cells 3 and 5 in battery group 1 are switched in, battery cell 7 in battery group 2 is switched in, and so on to battery group M where battery cells 9 and 11 are switched in. The control unit 2 may turn ON all the switching elements in the battery pack.

FIG. 5 depicts an example of charging voltage waveforms for battery cells of battery pack 1 during pulse charging. The figure shows the timing in accordance with some embodiments to achieve different switch configurations in the battery pack 1 during charging. For purposes of explanation, the switch configuration shown in FIG. 4 will be used. At time c1, the control unit 2 (via its control logic) may turn ON switching element 13 (via the corresponding control line in the set of switching lines $S_1$) to provide charging current through battery cell 3 in battery group 1. Likewise, switching element 16 and so on through switching element 19 may be turned ON to provide charging current through respective battery cell 7 and so on to battery cell 10 in respective battery group 2 and so on to battery group M. Pulse 1 may represent the switching pulse that turns ON switching elements 13, 16 and so on to switching element 19 that comprise the first switch configuration.

At time c2, the switch configuration may be changed. The switching elements in the current switch configuration that are turned ON at time c1 will be turned OFF, and the switching elements for the next switch configuration will be turned ON. Pulse 2 may represent the switching pulse that turns ON the switching elements for the next switch configuration.

As the timing chart in FIG. 5 indicates, the switching elements for the current switch configuration may be turned OFF at the same time the switching elements for the next switch configuration are turned ON. In other words, the falling edge of pulse 1 may coincide in time with the rising edge of pulse 2.

Although not shown, in other embodiments, there may be some overlap between when the switching elements for the current switch configuration are turned OFF and when the switching elements for the next switch configuration are turned ON. In other words, the rising edge of pulse 2 may occur earlier in time than the falling edge of pulse 1. This overlap in the timing between switch configurations ensures that charging current from the charger 4 is always flowing through the battery pack 1; i.e., at least some battery cells are receiving the charging current from the charger 4.

The particular configuration of switching elements depends on considerations such as the current carrying capacity of the charger 4. Some chargers have limited current handling, so switch configurations where only one battery cell per battery group is switched in may be appropriate. More robust chargers (e.g., chargers that are capable of handling high peak pulsed currents) may be able to handle higher current loads, and so may be able to support switch configurations where two or more battery cells per battery group are switched in.

In some embodiments, the number of battery cells in a battery group that are switched in may vary from one charge pulse to another. Considerations for the particular switch configuration include the state of the charging process (e.g., constant current mode vs. constant voltage mode, etc.), state of charge of the battery cells, different age points of the battery pack 1, and so on.

In some embodiments, sub-groups of battery cells in a battery group may be switched in parallel without overlap. In some embodiments, where the charger 4 is a switching power supply, the turning ON and OFF of the switching elements may be synchronized with switching timing of the switching power supply.

Figure 6:
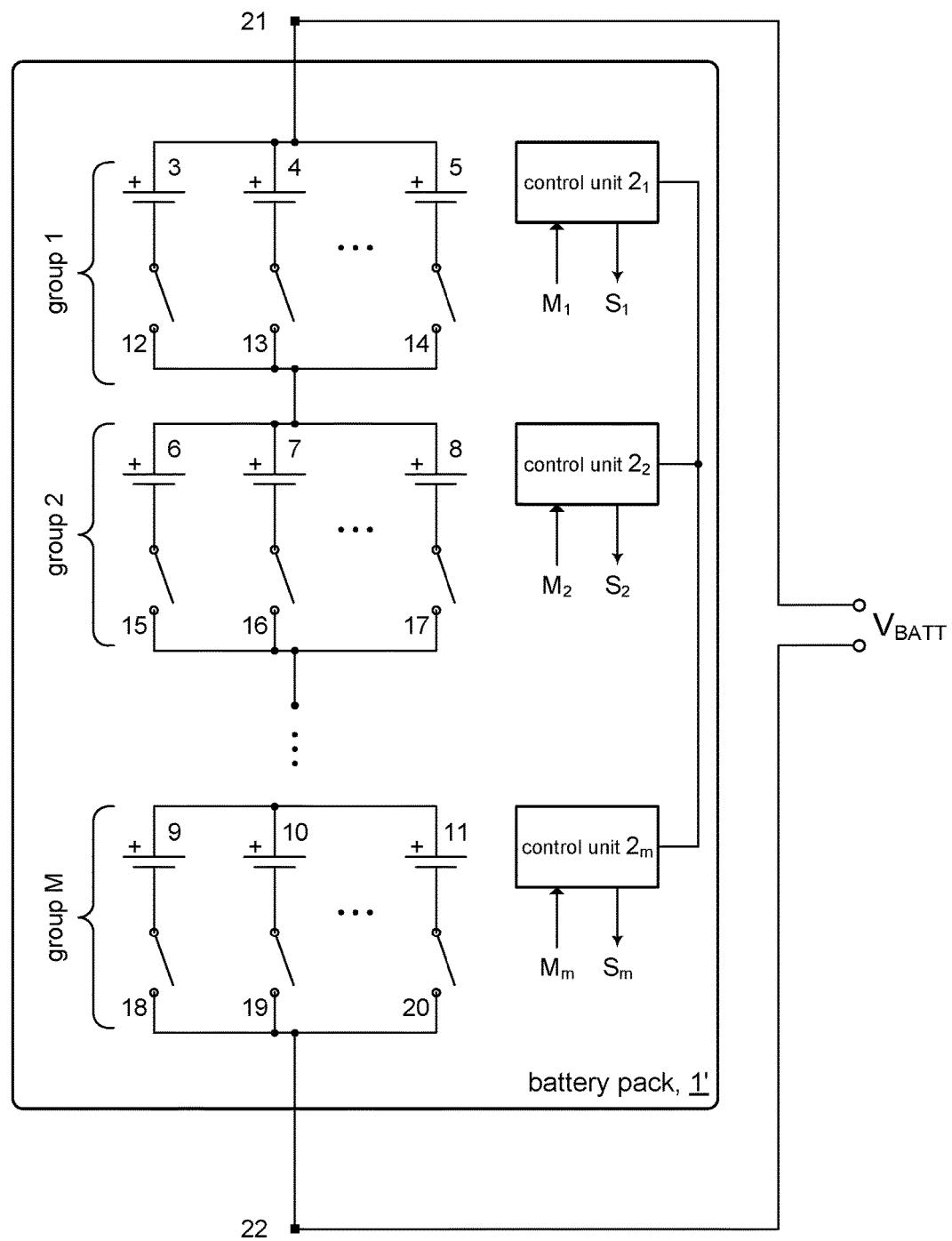
FIG. 6 shows an embodiment of a battery pack in accordance with the present disclosure.

FIG. 6 shows an embodiment of a battery pack 1' in accordance with the present disclosure. In some embodiments, the battery pack 1' may comprise separate control units $2_1$, $2_2$, ... $2_m$ for the respective battery groups 1, 2, ... M. The control units $2_1$, $2_2$, ... $2_m$ may be interconnected in order to coordinate turning ON and OFF the switching elements; e.g., in order to ensure that each battery group has at least one switching element in the CLOSED state in order to close the circuit between terminals 21 and 22. In other embodiments, some of the control units $2_1$, $2_2$, ... $2_m$ may be configured to control multiple battery groups, rather than having the one control unit-to-one battery group configuration shown in FIG. 6.

Figure 6A:
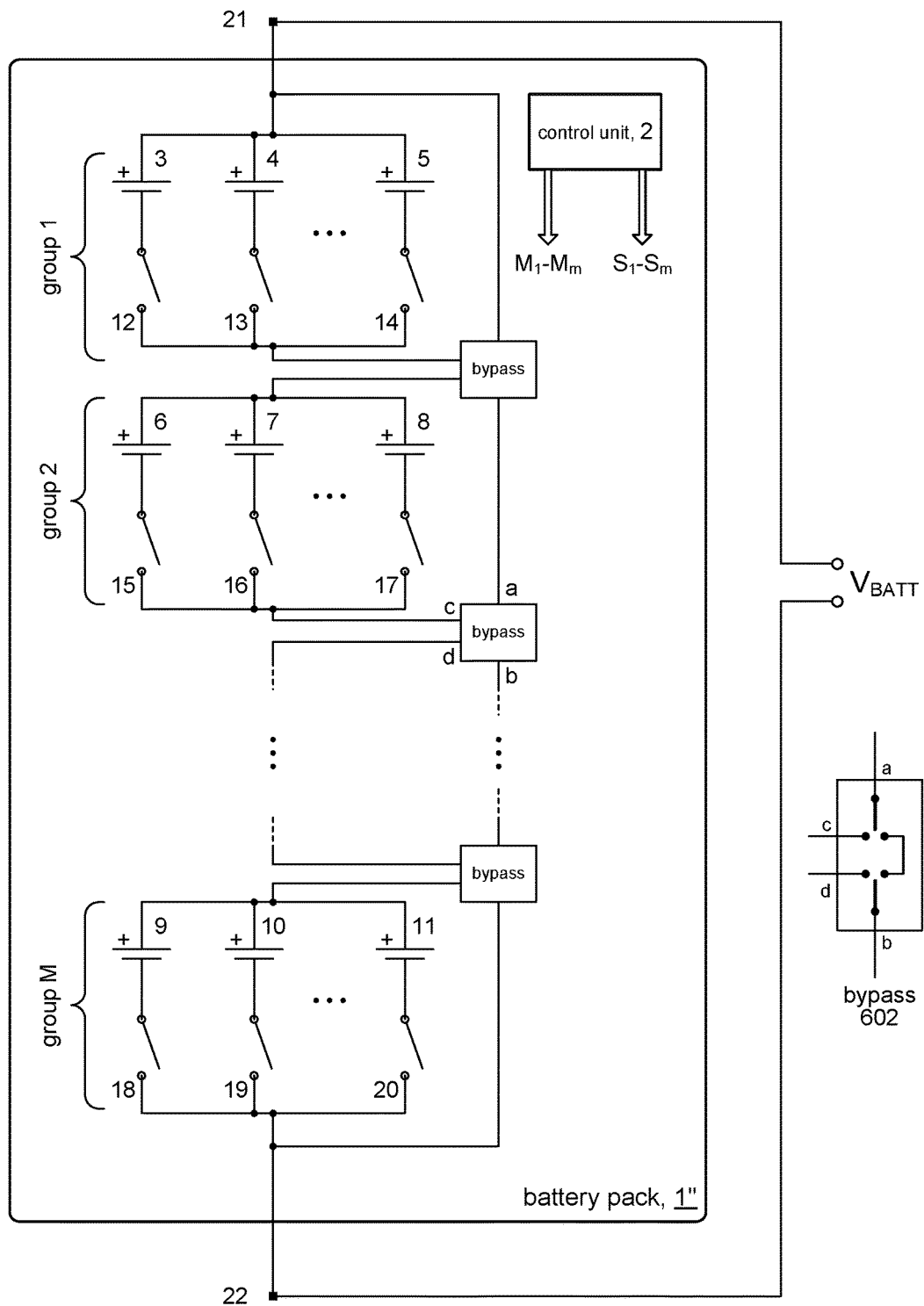
FIG. 6A shows an embodiment of a battery pack in accordance with the present disclosure.

FIG. 6A shows an embodiment of a battery pack 1" in accordance with the present disclosure. In some embodiments, the battery pack 1" may comprise bypass units between battery groups. The bypass units may be activated to bypass one or more battery groups. FIG. 6A shows some details for a bypass unit 602 in accordance with some embodiments. The bypass units may be useful for reacting to failure in one or more battery groups, providing balancing, providing overvoltage protecting on FETs, mitigating transitions of battery cell switching (e.g., compensate for back EMF), and the like.

Figure 7:
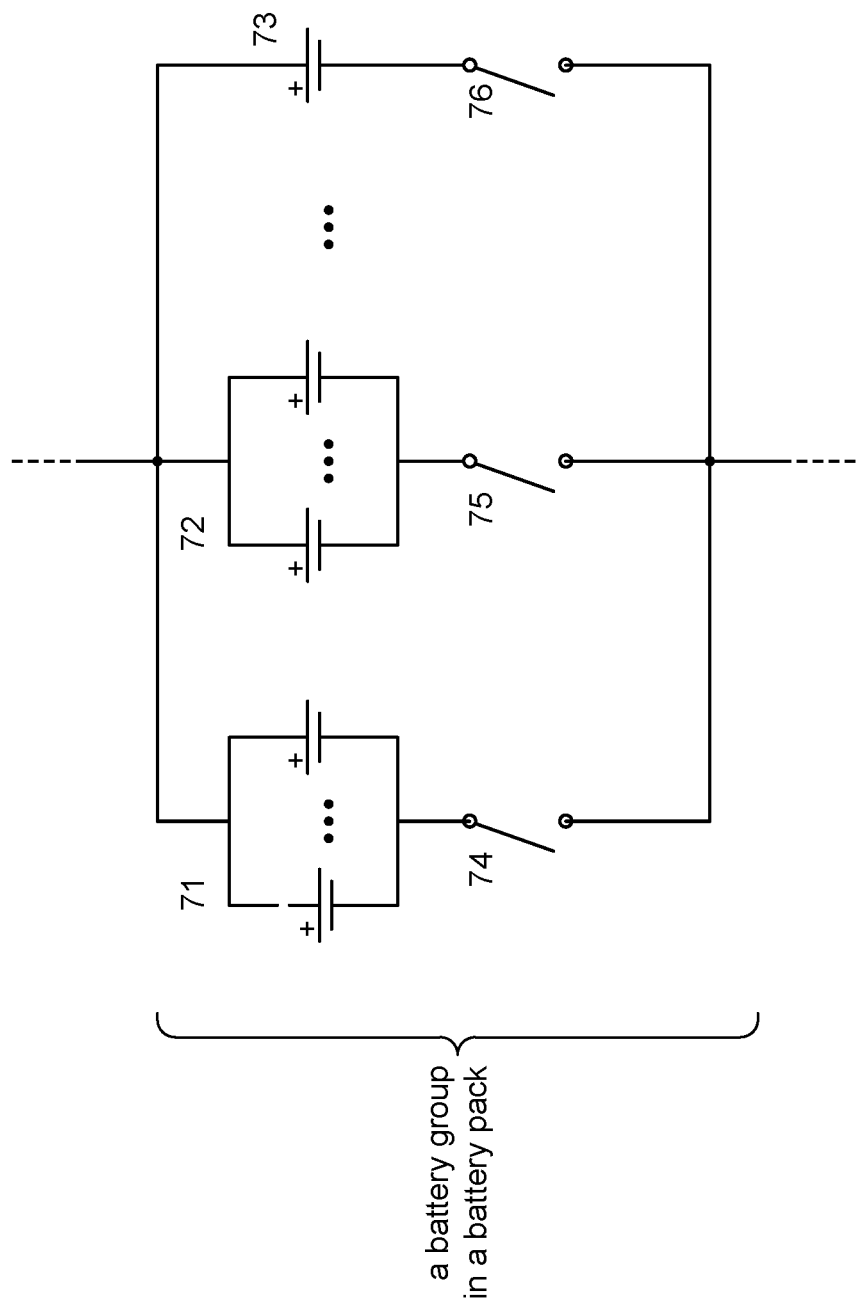
FIG. 7 illustrates a battery group in accordance with the present disclosure.

FIG. 7 shows an embodiment of a battery group in a battery pack in accordance with the present disclosure. In some embodiments, the battery cells in a battery group of a battery pack may be switched together. FIG. 7, for example, shows a battery group of battery cells having a sub-group of battery cells 71 that are all switched by switching element 74 and another sub-group of battery cells 72 that are all switched by switching element 75. The battery cells in a sub-group (e.g., 71) may be the same kind of battery cell, or may be different kinds of battery cells (e.g., different capacity, size, shape, etc.). Such variations inside of the same battery cell subgroup allows for a battery pack that can fit in irregularly shaped enclosures. The battery group may contain sub-groups of battery cells or a mixture of individual battery cells and sub-groups of battery cells. The battery group in FIG. 7, for example, includes a single battery cell 73 that is switched by its own corresponding switching element 76.

In some embodiments, one or more battery groups may include alternative storage elements (e.g., super caps) that can be switched in during certain times (e.g., peak load conditions) and then disabled until more favorable conditions for re-charging exist. In some embodiments, the alternative storage elements may be used as by-pass elements to mitigate switching between cells during charging to sustain an average current flow.

Figure 8:
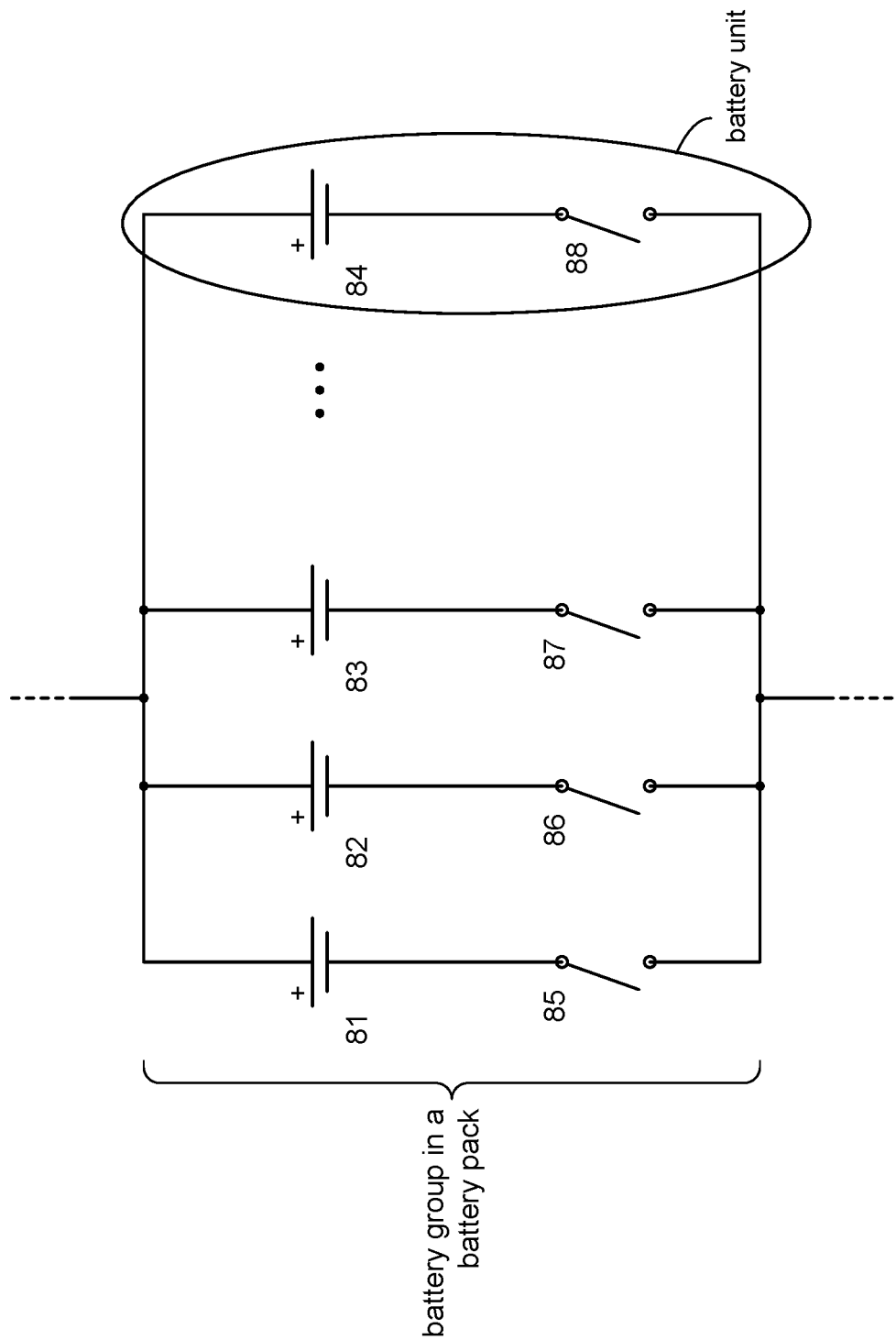
FIGS. 8 and 8A illustrate a battery group in accordance with the present disclosure.

In some embodiments, the battery cells in a battery group may be different in capacity, size, shape, charge/discharge rate. Such variations inside of the same battery cell subgroup allows for a battery pack that can fit in irregularly shaped enclosures. The use of different battery cells in a battery group can accommodate different charge rates during partial battery pack charge. Referring to FIG. 8, for example, suppose battery cells 81, 82 are a 3.7 V battery cells with very high rate of charge and battery cells 83 through 84 are regular charge rate 3.7 V cells. If a partial ultra fast charge of the battery pack is required, then battery cells 81, 82 may be switched in via respective switching elements 85, 86 to partially charge the battery pack using the ultra high charging rate of battery cells 81, 82. When a sufficient partial charge of the battery pack is achieved, the other slower charging battery cells (e.g., 83-84) may be switched in via respective switching elements 87-88.

Figure 8A:
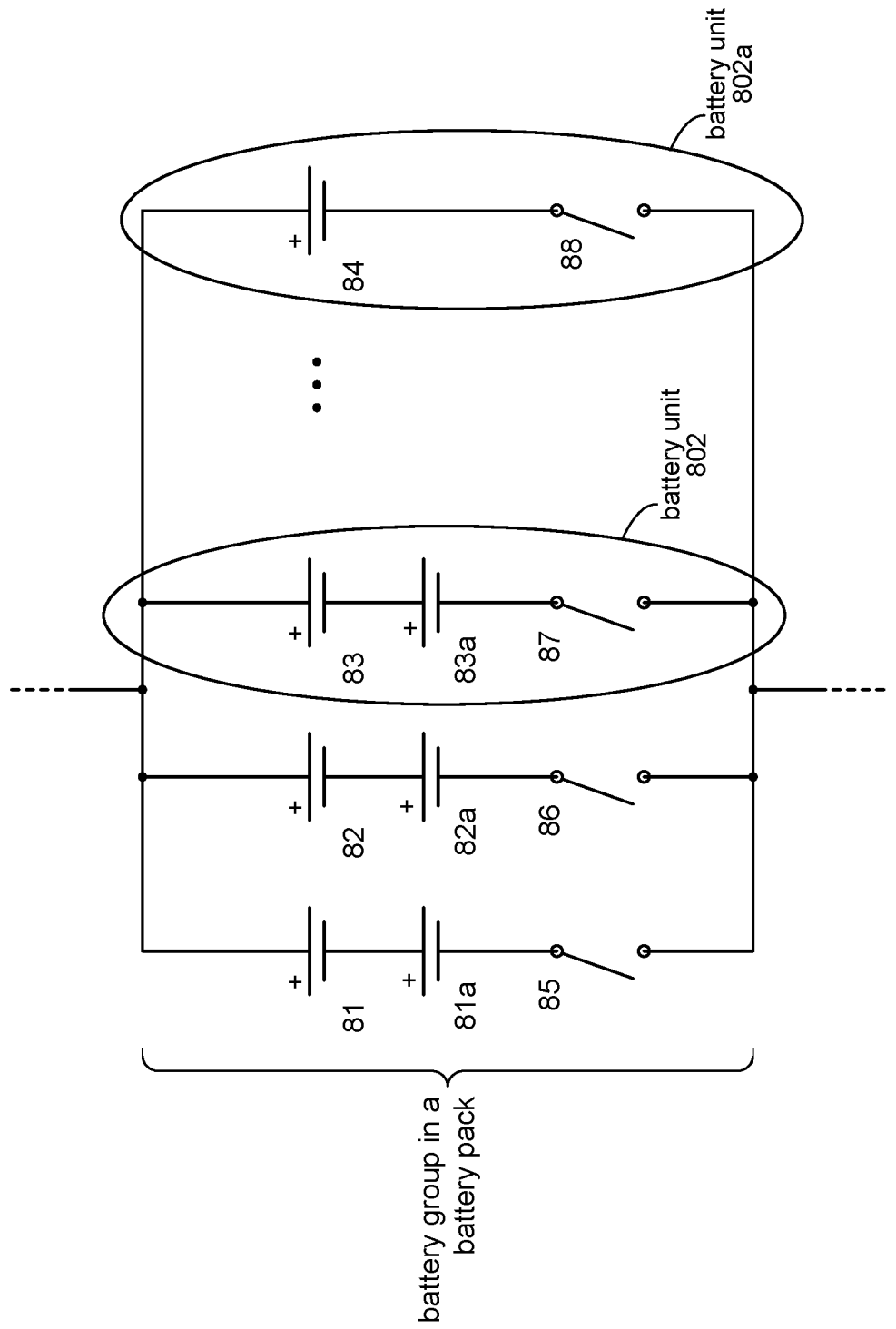

FIG. 8A shows that in some embodiments, the battery cells in a battery group can be organized in battery units 802. A battery unit can comprise one battery cell (e.g., battery unit 802a) or two or more battery cells connected in series. FIG. 8A, for example shows three battery units, each having two series-connected battery cells 81/81a, 82/82a, 83/83a. In other embodiments (not shown) a battery unit can comprise more than two series-connected battery cells. A battery group can comprises battery units having different numbers of battery cells. FIG. 8A, for example, shows that battery unit 802 comprises two battery cells 83/83a, while battery unit 802a has a single battery cell 84.

Recall that the controller 2, in accordance with the present disclosure, can use measurements of the battery cells taken during the time of charging the battery pack 1 to determine the ON times and OFF times of the switching elements to provide optimized charging on a battery cell by battery cell basis; for example by controlling the ON times and OFF times (which can be expressed as duty cycles) of switching pulses that comprise the control signals to the switching elements.

Figure 9:
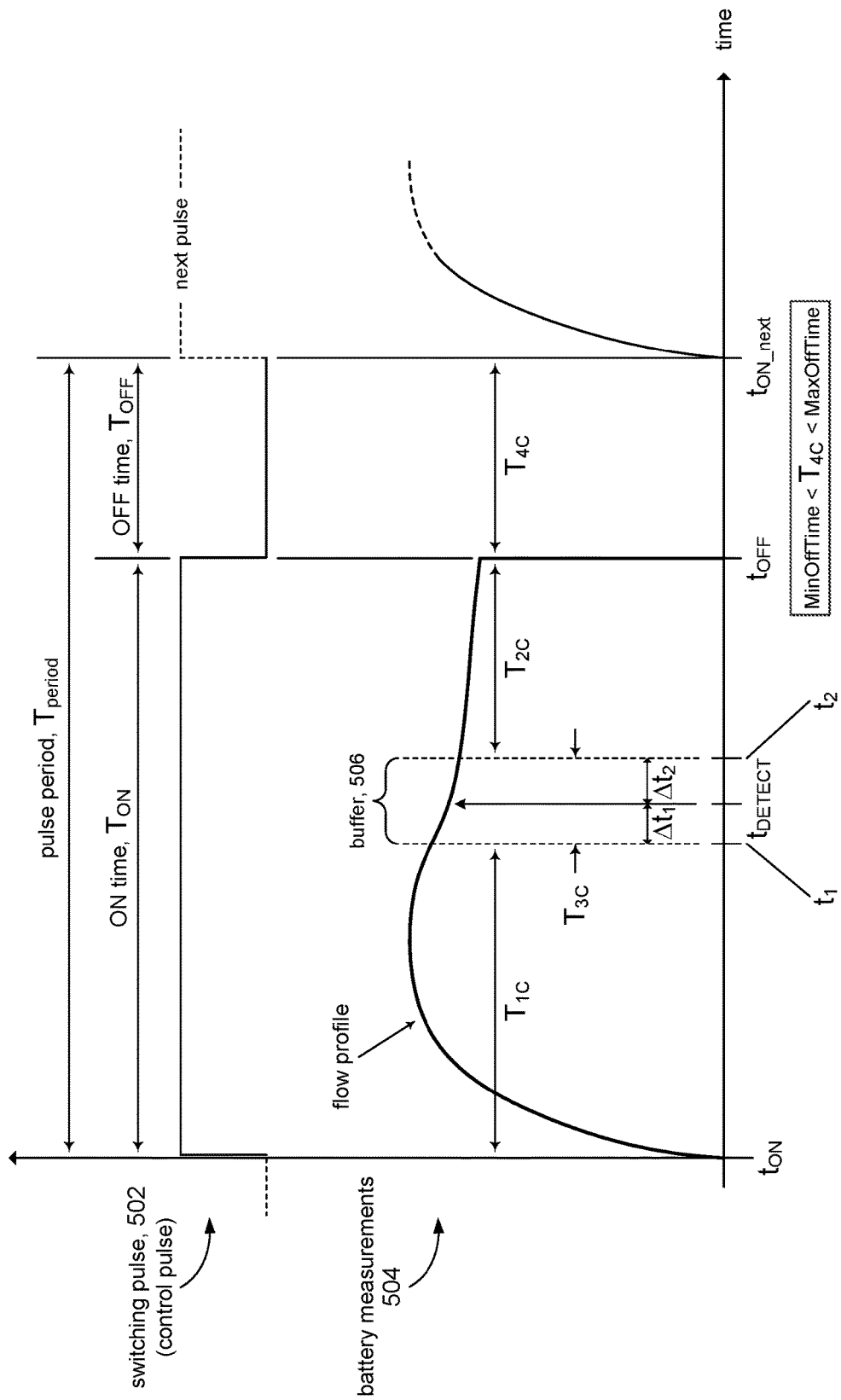
FIG. 9 illustrates details for determining the duty cycle of a charging pulse in accordance with the present disclosure.

FIG. 9, for example, shows the parameters of a switching pulse 502 for charging a battery cell. It will be appreciated that the following description applies to each battery cell in the battery pack 1. Assume for discussion purposes that the pulse period for switching pulse 502 is $T_{period}$. In some embodiments, the pulse period can be the same for each pulse. In other embodiments, the pulse period can vary from one pulse to the next; see, for example, commonly owned U.S. application Ser. No. 15/644,498 filed Jul. 7, 2017, the content of which is incorporated herein by reference in its entirety for all purposes. The switching pulse 502 has an ON time ($T_{ON}$) and an OFF time ($T_{OFF}$). The duration of $T_{ON}$ and $T_{OFF}$ can be dynamically determined based on battery measurements 504 made during the ON time of the switching pulse 502.

The battery measurements 504 can comprise measurements of current flow through the battery cell. Current flow through the battery cell can gradually increase from the time $t_{ON}$ that the switching pulse 502 is applied and follow a flow profile such as shown in FIG. 9. The flow profile of current through the battery cell depends on factors such as battery chemistry, state of charge, temperature, and the like. In a lithium ion battery, for example, the lithium ions flow from the positive electrode to the negative electrode through the electrolyte. The electrons and lithium ions combine at the negative electrode and deposit there. During a charging pulse, charge current saturation can occur where additional charge current into the battery cell for that switching pulse 502 may not be effective and may even be detrimental (e.g., cause heat build up, create mechanical stress).

In accordance with the present disclosure, the controller 2 (e.g., control logic 306) can analyze or otherwise track the current flow to detect the onset charge current saturation by looking for a change in the flow profile. Suppose at time $t_{DETECT}$ the controller 2 detects such a change in the flow profile. The time of detection $t_{DETECT}$ can be used to determine the duration $T_{ON}$ of the ON time of the switching pulse 502, for example, in order to limit the charge current into the battery cell. A first time period $T_{1C}$ between $t_{ON}$ and $t_{DETECT}$ can be computed by backing off a margin of time $\Delta t_1$ from $t_{DETECT}$, for example, by computing $t1=t_{DETECT}-\Delta t_1$. A buffer period 506 comprising the margin of time $\Delta t_1$ and $\Delta t_2$ can be provided around the detection time $t_{DETECT}$ to account for uncertainty in the detection of the onset of charge saturation. The first period $T_{1c}$ can be the period between time $t_{ON}$ and time $t_1$.

A second time period $T_{2c}$ can be computed based on keeping the second time period within a predetermined range. During the second time period $T_{2c}$, charge saturation can be a dominant factor during the charging pulse. In some embodiments, the second time period $T_{2C}$ can be determined in order to maintain a certain ratio R between $T_{1c}$ and $T_{2c}$. For example, $T_{2C}$ can be computed from the relation: $R=T_{1c}/T_{2c}$, where R can be a predetermined ratio. The ON time $T_{ON}$ can be computed as $T_{ON}=(T_{1c}+T_{2C}+T_{3C})$, where $T_{3C}$ is the width of the buffer 502. By dynamically computing the ON time for each switching pulse 502, battery charging can be more efficient, battery damage that inherently arises during charging (e.g., heat build up) can be reduced (which can contribute to safety), and battery life can be extended.

In accordance with the present disclosure, the OFF time $T_{OFF}$ ($T_{4c}$) of the switching pulse 502 can be computed by subtracting the $T_{ON}$ from the selected pulse period $T_{period}$. However, if the resulting OFF time is too long, then overall battery charging time can be increased, which is typically undesirable. Accordingly, in accordance with the present disclosure if the $T_{OFF}$ exceeds a predetermined maximum time MaxOffTime, $T_{OFF}$ can be set to MaxOffTime.

If, on the other hand, the resulting OFF time is too short, then there may not be enough recovery time for various chemical reactions in the battery cell to run their course before the onset of the next charging pulse; more time may be needed. Accordingly, in accordance with the present disclosure, if the $T_{OFF}$ becomes less than a predetermined minimum time MinOffTime, $T_{OFF}$ can be set to MinOffTime to allow time for the chemical reactions to take place before initiating the next charging pulse. As a consequence, the actual pulse period of the switching pulse 502 will be different from the selected pulse period $T_{period}$.

As noted above, in accordance with the present disclosure, the switching elements 12-20 of the battery pack 1 may be controlled such that the charge current from the charger 4 flowing into the battery pack 1 through terminals 21 and 22 is uninterrupted at all times while the battery pack is being charged. In some embodiments, for example, the switching pulses provided to the battery groups (group 1, group 2, etc.) can be adjusted (e.g., by lengthening or shortening OFF times, $T_{OFF}$) so that the ON times of at least one switching pulse in each battery group overlap with one another so that a complete circuit can be created through each battery group (e.g., FIG. 4).

The amplitude of the charging current of the charging pulse can vary from one charging pulse to the next, during the charging process. The inventors of the present disclosure have noted that the OFF time of one charging pulse can affect the charging current amplitude. Accordingly, in some embodiments, rather than basing the OFF time on the selected pulse period $T_{period}$, the OFF time can be varied between MinOffTime and MaxOffTime in response to the amplitude of the charging current I.

In some embodiments, the output voltage of the charger 4 can be selected for different switching pulses 502. A reason for doing this might be to limit the "headroom" for the current of the switching pulse 502. The battery impedance can be a highly dynamic parameter whose value can change very quickly. It can be impractical, and in some cases may not be feasible, to use a conventional feedback loop to control the charging current to accommodate for a changing battery impedance. In accordance with some aspects of the present disclosure, the output voltage of the charger 4 can be adjusted to limit its output level so that the current flow into the battery cell does not exceed safety levels. For example, suppose the safety limit sets a peak charging current of the battery cell to be 35 A. If we expect the battery cell to have a minimum battery impedance of 100 mΩ, and an open circuit voltage (OCV) of 3.5 V, this establishes a 11V output voltage for the charger 4:

3.5V+35 A×0.1Ω=11V.

In other embodiments, instead of limiting the output voltage of the charger 4, the switching element connected to the battery cell can be used to limit the flow of charging current into battery cell. In the case of an FET type switching element, for example, the controller 2 can produce an analog output to adjust the gate-source voltage of the FET and hence the device channel saturation of the FET, to control the charging current into the battery cell.

The battery impedance can change dynamically from one charging pulse to another. For a given charging pulse, the battery impedance can be at some initial value at the beginning of the charging pulse and at some higher value at the end of the charging pulse. The impedance change during the pulse period can be non-linear in time. The lowest and highest values of the battery impedance during a given charging pulse can vary during the charging process. These impedance changes can be predicted based on impedance values previously recorded during other charges of the battery or based on a mathematical model of the battery.

Figure 10:
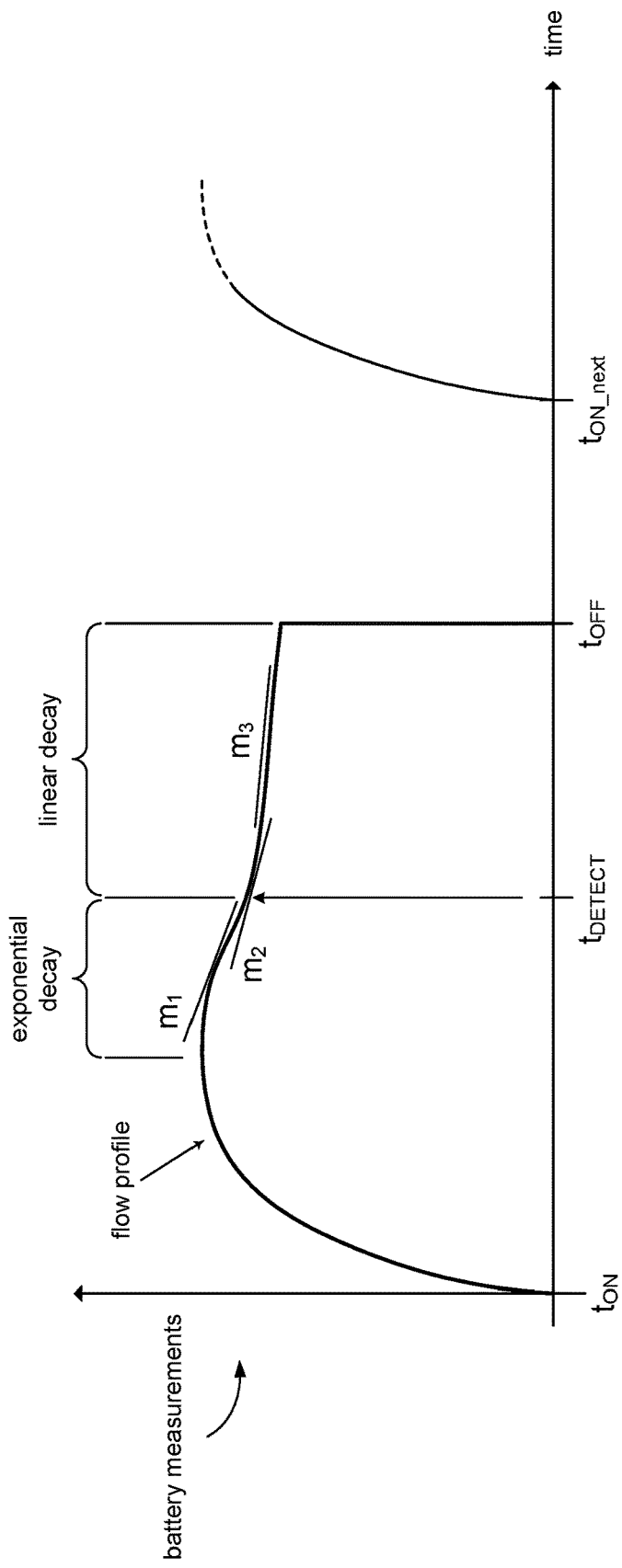
FIG. 10 illustrate details for detecting a change in the current flow through a battery in accordance with the present disclosure.

FIG. 10 illustrates an example of detecting a change in the current flow through the battery cell that can be indicative of the onset of charge current saturation. In some embodiments, for example, the flow profile may include a exponential decay portion and a linear decay portion. The slope of the flow profile can be monitored to detect the transition between the exponential decay portion and the linear decay portion. For example, the slope can be monitored at the onset of the charging pulse at time $t_{ON}$. In some embodiments, the monitoring can begin at some time after $t_{ON}$, since saturation does not happen right away. In some embodiments, the rate of change of the slope (i.e., second derivative of the flow profile) can be used to determine when the change in the current flow through the battery has occurred. In other embodiments, we can monitor for the rate of change of the rate of change (i.e., a third derivative) of the charging current. In particular, we can detect for a change in the sign of the third derivative.

It will be appreciated that other detection techniques can be used. In some embodiments, for example, the change can be associated with switching from exponential current decline into linear current decline. In other embodiments, detection can be based on switching from one exponential decline into another much slower exponential decline, and so on.

Figure 11:
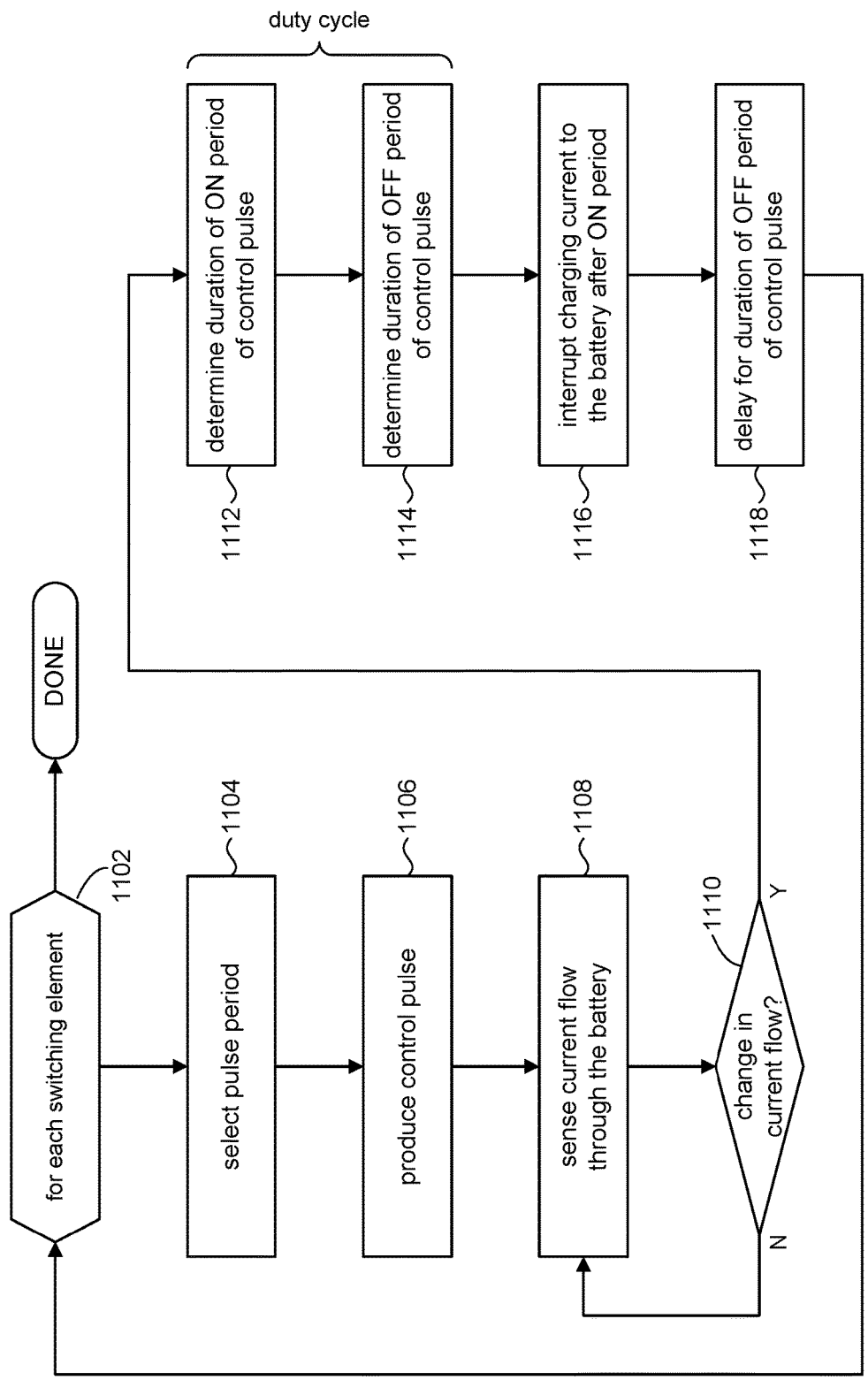
FIG. 11 shows processing in the controller for frequency modulated charging in accordance with the present disclosure.

Referring to FIG. 11, the discussion will now turn to a high level description of processing in the controller 2 for generating control signals to operate switching elements 12-20 when charging the battery pack 1 in accordance with the present disclosure. In some embodiments, for example, the controller 2 may include computer executable program code or equivalent firmware (e.g., field programmable gate array, FPGA), which when executed cause the controller 2 to perform the processing in accordance with FIG. 11. The flow of operations performed by the controller 2 is not necessarily limited to the order of operations shown.

At block 1102, the controller 2 can produce a control signal for each switching element 11-20 in the battery pack 1 according to the following during charging of the battery pack. The control signal comprises a plurality of control pulses, that control the ON/OFF state of the corresponding switching element to provide pulse charging of battery cell(s) comprising the battery unit (e.g., 802a, FIG. 8A) connected to the switching element.

At block 1104, the controller 2 can select a pulse period for the given control pulse. In some embodiments, the pulse period can be the same for each switching element. In other embodiments, the pulse period can vary depending on the switching element. In other embodiments, the pulse period can very from one period to another, and so on.

At block 1106, the controller 2 can output the control pulse to turn ON the switching element, thus providing a charging pulse to the battery cell(s) for the duration of the ON time of the charging pulse.

At block 1108, the controller 2 can sense current flow through the battery unit connected to the switching element, in some embodiments.

At block 1110, the controller 2 can analyze the battery measurements to detect a change in current flow through the battery cell, which for example, may indicate the onset of charge current saturation in the battery cell. If a change in the flow profile has not been detected (e.g., per FIG. 10), the controller 2 can return to block 1108. Otherwise, processing can continue to block 1112.

At block 1112, the controller 2 can determine the duration of the ON time $T_{ON}$ of the charging pulse such as explained, for example, in connection with FIG. 10, for example.

At block 1114, the controller 2 can determine the OFF time $T_{OFF}$ of the charging pulse. If the ON time for the charging pulse is short, that can result in too long of an OFF time; in which case, $T_{OFF}$ can be set to MaxOffTime. Conversely, if the ON time for the charging pulse is long, that can result in too short of an OFF time; in which case, $T_{OFF}$ can be set to MinOffTime. As noted above, in accordance with the present disclosure, the switching elements 12-20 of the battery pack 1 may be controlled such that the charge current from the charger 4 flowing into the battery pack 1 through terminals 21 and 22 is uninterrupted at all times while the battery pack is being charged. In some embodiments, for example, the controller 2 can coordinate the pulses provided to the battery groups (e.g., by increasing or decreasing the OFF times, $T_{OFF}$) so that the ON times of at least one pulse in each battery group overlap with one another in order to create a complete circuit through each battery group between terminals 21 and 22 (e.g., FIG. 4).

At block 1116, the controller 2 can turn OFF the switching element at the end of the ON time determined at block 1112 to interrupt the flow of charging current from the charger 4 through the battery unit connected to the switching element.

At block 1118, the controller 2 can delay for a period of time equal to $T_{OFF}$ before initiating the next charging pulse. During this delay period, the interruption of charging current from the charger 4 through the battery unit can be a complete interruption if the switching element is fully OFF (i.e., no flow of charging current to the battery). In some embodiments, during this delay period, some flow of current from the charger 4 can be provided through the battery unit, for example, by partially turning OFF the switching element or controlling the charger 4 to provide a small amount of trickle current through the battery unit. In other embodiments, the charger 4 can be controlled to create a reverse flow of current through the battery unit; e.g., a discharge current.

The above flow was described using measurements of current flow through the battery unit as the criterion for controlling the switching element. In other embodiments, the measurement circuit (e.g., 304) can be configured to measure characteristics in addition to or instead of current flow (e.g., battery voltage), which the controller 2 can use as a basis for controlling the switching element.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system, comprising:
   a battery pack comprising a plurality of series-connected battery groups, each battery group, of the plurality of series-connected battery groups, comprising a plurality of parallel-connected switched battery units, and a plurality of battery switches, each switched battery unit of the plurality of parallel-connected switched battery units comprising one or more series-connected battery cells, connected to a corresponding battery switch of the plurality of battery switches; and
   a controller configured to generate a plurality of pulsed switching signals to control the plurality of battery switches for charging the battery pack, each pulsed switching signal corresponding to one of the plurality of battery switches,
   wherein:
      each pulsed switching signal comprises a series of pulses, each pulse having ON time and OFF time, which are dynamically determined based on one or more characteristics of the battery unit associated with the corresponding battery switch, wherein the one or more characteristics are measured during the ON time of the pulse, and wherein the dynamically determined ON time and OFF time of the pulses comprised in the pulsed switching signal optimize charging of the battery unit associated with the corresponding battery switch, and
      one or more battery switches in each battery group are in a CLOSED state to provide a path for an uninterrupted flow of charging current through the plurality of series-connected battery groups of the battery pack at all times during charging of the battery pack.

2. The system of claim 1, wherein the controller is configured to measure one or more characteristics of the battery cells, the battery units, or the battery pack.

3. The system of claim 2, wherein the controller comprises a plurality of measurement circuits, each measurement circuit associated with one or more of the plurality of series-connected battery groups, and a plurality of pulse generators, each pulse generator associated with one or more of the plurality of series-connected battery groups.

4. The system of claim 1, wherein the ON time of one or more pulses of the pulsed switching signals that control the plurality of battery switches in each battery group overlaps with the ON time of one or more pulses of the pulsed switching signals of the other battery groups to provide a path for the uninterrupted flow of charging current through the plurality of series-connected battery groups of the battery pack.

5. The system of claim 1, wherein the controller is configured to determine OFF times of the pulses of the pulsed switching signals for all of the battery switches, which achieve a flow of charging current through the battery pack within a particular range of current flow.

6. The system of claim 1, wherein the controller is configured to determine OFF times of the pulses of pulsed switching signals for all of the battery switches, which achieve a flow of charging current through the battery pack at a substantially constant current flow.

7. The system of claim 1, wherein the one or more characteristics measured during the ON time of the pulse includes at least a rate of change of the charging current through the battery unit associated with the battery switch to which the pulsed switching signal comprising the pulse corresponds to.

8. The system of claim 1, further comprising a lookup table that is configured to store previously measured characteristics of the battery cells, wherein some of the one or more characteristics are accessed from the lookup table.

9. A method to charge a battery pack comprising a plurality of series-connected battery groups, each battery group, of the plurality of series-connected battery groups, comprising a plurality of parallel-connected switched battery units, and a plurality of battery switches, each switched battery unit, of the plurality of parallel-connected switched battery units, comprising one or more series-connected battery cells connected to a corresponding battery switch, of the plurality of battery switches, the method comprising:
   generating a plurality of pulsed switching signals to control the plurality of battery switches for charging the battery pack, each pulsed switching signal corresponding to one of the plurality of battery switches;
   for each pulsed switching signal, generating a series of pulses to control the battery switch that corresponds to the pulsed switching signal, each pulse having ON time and OFF time that are dynamically determined based on one or more characteristics of the battery unit associated with the corresponding battery switch, wherein the one or more characteristics are measured during the ON time of the pulse, and wherein the dynamically determined ON time and OFF time of the pulses comprised in the pulsed switching signal optimize charging of the battery unit associated with the corresponding battery switch; and
   providing a path for an uninterrupted flow of charging current through the plurality of series-connected battery groups of the battery pack at all times during charging of the battery pack.

10. The method of claim 9, wherein providing the path for the uninterrupted flow of charging current includes overlapping the ON time of one or more pulses of the pulsed switching signals in each battery group.

11. The method of claim 9, further comprising determining OFF times of the pulses of the pulsed switching signals for all of the battery switches, which achieve a flow of charging current through the battery pack within a particular range of current flow.

12. The method of claim 9, further comprising determining OFF times of the pulses of the pulsed switching signals for all of the battery switches, which achieve a flow of charging current through the battery pack at a substantially constant current flow.

13. The method of claim 9, further comprising making measurements on the battery cells to obtain at least some characteristics of each battery cell, each battery unit, or the battery pack.

14. The method of claim 9, further comprising accessing a lookup table comprising previously measured characteristics of the battery cells to obtain at least some characteristics of each battery cell.

15. A control circuit in a battery pack comprising a plurality of series-connected battery groups, each battery group, of the plurality of series-connected battery groups, comprising a plurality of parallel-connected switched battery units, each switched battery unit, of the plurality of parallel-connected switched battery units, comprising one or more series-connected battery cells, connected to an associated battery switch, wherein the control circuit is configured to:

generate a plurality of pulsed switching signals to control the plurality of battery switches for charging the battery pack, each pulsed switching signal corresponding to one of the plurality of battery switches;

for each pulsed switching signal, generate a series of pulses to control the corresponding battery switch, each pulse having ON time and OFF time that are dynamically determined based on one or more characteristics of the battery unit associated with the corresponding battery switch, wherein the one or more characteristics are measured during the ON time of the pulse, and wherein the dynamically determined ON time and OFF time of the pulses comprised in the pulsed switching signal optimize charging of the battery unit associated with the corresponding battery switch; and provide a path for an uninterrupted flow of charging current through the plurality of series-connected battery groups of the battery pack during entire time of charging the battery pack.

16. The control circuit of claim 15, wherein, to provide the path for the uninterrupted flow of charging current, the controller is configured to overlap the ON time of one or more pulses of the pulsed switching signals in each battery group.

17. The control circuit of claim 15, wherein the controller is further configured to make measurements on the battery cells to obtain at least some characteristics of each battery cell.

18. The control circuit of claim 15, wherein the controller is further configured to access a lookup table comprising previously measured characteristics of the battery cells to obtain at least some characteristics of each battery cell.

19. The control circuit of claim 15, wherein the controller comprises a first circuitry to make the one or more measurements for each battery cell, and a second circuitry to generate the plurality of pulsed switching signals.

20. The control circuit of claim 15, wherein the controller comprises a plurality of measurement circuits, each measurement circuit associated with one or more of the battery cells, one or more of the battery units, one or more of the battery groups, or the battery pack, and a plurality of pulse generators, each pulse generator associated with one or more of the plurality of series-connected battery groups.

* * * * *